US012682020B2

(12) United States Patent
Goodsitt et al.

(10) Patent No.: US 12,682,020 B2
(45) Date of Patent: Jul. 14, 2026

(54) SYSTEMS AND METHODS FOR IMPLEMENTING A DIGITAL CONTAINER

(71) Applicant: Capital One Services, LLC, McLean, VA (US)

(72) Inventors: Jeremy Goodsitt, Champaign, IL (US); Christopher Wallace, San Francisco, CA (US); Daniele Rosa, Saugus, MA (US); Samuel Sharpe, Cambridge, MA (US); Galen Rafferty, Mahomet, IL (US); Austin Walters, Savoy, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 322 days.

(21) Appl. No.: 18/161,837

(22) Filed: Jan. 30, 2023

(65) Prior Publication Data

US 2024/0256639 A1 Aug. 1, 2024

(51) Int. Cl.
*G06F 21/10* (2013.01)
*G06F 21/60* (2013.01)

(52) U.S. Cl.
CPC ........ *G06F 21/1077* (2023.08); *G06F 21/602* (2013.01); *G06F 21/1015* (2023.08)

(58) Field of Classification Search
CPC .............. G06F 21/602; G06F 21/1015; G06F 21/1077; G06F 21/6218; G06F 2221/2137
See application file for complete search history.

(56) References Cited

U.S. PATENT DOCUMENTS

| | | | |
|---|---|---|---|
| 8,126,139 B2 * | 2/2012 | Rose ..................... | H04L 9/3236 380/42 |
| 8,645,687 B2 * | 2/2014 | Taylor ................. | G06F 21/1014 713/165 |
| 11,627,136 B1 * | 4/2023 | Sharifi Mehr ........ | G06F 21/604 726/28 |
| 11,659,257 B2 * | 5/2023 | Navali ............. | H04N 21/85406 725/31 |
| 2009/0037742 A1 * | 2/2009 | Narayanaswami ... | H04L 9/3231 713/186 |
| 2012/0173884 A1 * | 7/2012 | Patil .................... | G06F 21/6209 713/189 |
| 2013/0212220 A1 * | 8/2013 | Fukuda ................. | H04W 48/18 709/217 |
| 2014/0095615 A1 * | 4/2014 | Ito .......................... | H04L 65/80 709/204 |

(Continued)

*Primary Examiner* — Bassam A Noaman
(74) *Attorney, Agent, or Firm* — Foley & Lardner LLP

(57) ABSTRACT

Systems and methods for implementing a digital container. In some embodiments, the system determines whether an access code to refresh access provisions for a user with respect to a digital asset was received within a period of time. Based on determining that the access code was not received within the period of time, the system executes one or more modification processes to render at least a portion of the digital asset inaccessible. Subsequent to the period of time elapsing, the system receives the access code to refresh the access provisions for the user with respect to the digital asset. Based on receiving the access code, the system executes one or more restoration processes to reverse the one or more modification processes, thereby restoring the access provisions for the user with respect to the digital asset.

17 Claims, 4 Drawing Sheets

400

(56) References Cited

U.S. PATENT DOCUMENTS

| | | | |
|---|---|---|---|
| 2022/0103524 A1* | 3/2022 | Lim ...................... | H04L 63/083 |
| 2023/0205849 A1* | 6/2023 | Jackson ................. | G06F 21/10 |
| | | | 726/26 |
| 2024/0086067 A1* | 3/2024 | Goh .................... | G06F 12/0238 |

* cited by examiner

100

300

400

SYSTEMS AND METHODS FOR IMPLEMENTING A DIGITAL CONTAINER

SUMMARY

Methods and systems are described herein for novel uses and/or improvements to access control methods. As one example, methods and systems are described herein for implementing a digital container that periodically degrades one or more portions of a digital asset accessible to a user if an access code to restore access provisions for the user is not timely received.

Existing systems for access control may not be able to control access to digital assets once a machine is disconnected from the internet. Furthermore, conventional systems may allow a user to subvert access control measures and preserve access to a digital asset by simply disconnecting the device from a computer network. For example, existing systems do not provide the ability to control access to a digital asset in real time based on an iterative process of modification and restoration of the digital asset over time, which may be triggered based on not receiving or receiving an access code, respectively. However, the difficulty in implementing such an iterative process to prevent access to digital assets regardless of connection status faces several technical challenges such as ensuring that, once a digital asset is modified, the process can be reversed and that the digital asset is restored in incremental steps depending on the iterative modification processes applied to the digital asset. Additionally, it is technically challenging to verify that criteria have been met to issue an access code and refresh access provisions when the machine has been disconnected from the internet or another suitable computer network.

To overcome these technical deficiencies for this practical benefit, methods and systems disclosed herein implement a digital container including, or capable of accessing, a digital asset and periodically modifying the digital asset to render one or more portions of the digital asset inaccessible to a user. The system may use an iterative process of modification followed by a corresponding iterative process of restoration to control access to the digital asset associated with the digital container. For example, the system may implement a digital container as a system-level process that can control access to the digital asset stored locally at the system. The digital container may include text, audio, or video for representing the digital asset. By modifying the digital asset included in the system-level digital container, the system may render one or more portions of the digital asset inaccessible to the user. In another example, the system may implement a digital container as an application-level process that can access the digital asset stored at a remote source. For example, the digital container may be executed on an operating system in a manner similar to other applications such as a text editor, email client, or database interface. By modifying the digital asset via the application-level digital container, the system may render one or more portions of the digital asset inaccessible to the user. Additionally, the system may check at regular intervals for the proper criteria to issue the access code to refresh access provisions.

Conventionally, access control systems are based on user identities. In some cases, access control may need to be more granular for specific digital assets. The modification and restoration process of specific digital assets solves the problem of a lack of granularity in access control. For example, if a user takes a device that is supposed to remain on the physical premises of an organization (e.g., a laptop for classified information, etc.), the contents of the device may include a digital container that includes digital assets that are not intended to be viewed by outsiders. The system may selectively modify assets contained on the user device to allow a user access to maintain the confidentiality of sensitive information belonging to the organization. In another example, the system may leverage a similar approach to enforce a digital rights management ("DRM") scheme. The system may degrade the quality of media based on user device characteristics and when the access code is not timely received by periodically modifying the pixels in an image or the frame rate of a video.

In some aspects, the system may determine whether an access code to refresh access provisions for a user with respect to a digital asset was received within a period of time. For example, a digital asset may include a document, a video, an audio recording, or a piece of software. Based on determining that the access code was not received within the period of time, the system may execute one or more modification processes to render at least a portion of the digital asset inaccessible. For example, if a device does not receive an access code during a first period of time, the device may execute a modification process to render at least a portion of the digital asset inaccessible. After the first period of time has elapsed, the device may wait for the access code during a second period of time. If the second period of time also elapses without the access code being received, the device may execute another modification process to render another portion of the digital asset inaccessible. If the access code is eventually received, e.g., during a third period of time, the device may execute a restoration process to reverse the last executed modification process to restore the digital asset to a state prior to when that particular modification process was executed. Further, the device may execute another restoration process to reverse the initially executed modification process to restore the digital asset to its original state.

In some embodiments, the multiple modification processes may be applied to the same portion of the digital asset as the multiple time periods elapse. For example, a modification process may be applied to a digital photograph such that every fifth pixel is shifted slightly. If a second modification process is performed, the same pixels may be shifted further. By shifting the same pixels, the modification processes may effectively degrade the quality of the digital photograph as time elapses regardless of internet connection. In some embodiments, the modification processes may be applied to different portions of the digital asset as the multiple time periods elapse. For example, a modification process may be applied to a video such that an initial portion is encrypted or otherwise distorted. If another modification process is performed, a different portion of the video is encrypted or otherwise distorted. By modifying specific portions of the video, the modification processes can effectively degrade the video as time elapses regardless of internet connection.

Subsequent to the period of time elapsing, the system may receive the access code to refresh the access provisions for the user with respect to the digital asset. For example, the access code to refresh the access provisions for the user may be distributed by a server that checks the integrity of a file on a host server against a reference; for example, if a document stored in a cloud service provider is also tokenized and represented as a non-fungible token ("NFT"), a server may hash the document stored on the cloud service provider and compare it to the hash of the document hashed in the NFT. If they match, the server may distribute an access code to the system. Alternatively, if the document on the cloud service provider is corrupted or missing, the server may not be able to hash the document and thus local copies on a machine would expire as no access code to refresh access provisions for the user will be distributed or received. Another example of receiving an access code may include a server checking a router to verify the media access control ("MAC") address of a machine connected to the network and, upon determining that a machine with a specific MAC address is on the network, releasing an access code to refresh access provisions for the user. In another example, an NFT may be used to prove the integrity of a document, specifically by comparing the hash of the original underlying digital asset to a newly generated hash of the digital asset and upon determining that they are the same, releasing an access code to refresh access provisions.

In response to receiving the access code, the system may execute one or more restoration processes to reverse the one or more modification processes, thereby restoring the access provisions for the user with respect to the digital asset. For example, one modification process may be reversed by using a corresponding restoration process. If two modification processes were performed in sequence, two restoration processes may be required to reverse the modifications. If two modification processes were executed in sequence on the same portion of the digital asset, the corresponding restoration processes can be executed in sequence to restore the same portion of the digital asset. For example, if an image is degraded by the modification processes shifting the pixels two times, then the restoration processes may shift the pixels two times in the opposite direction. If two modification processes were executed in sequence on different portions of the digital asset, the corresponding restoration processes can be executed in sequence to restore the respective portions of the digital asset, thereby restoring the digital asset to its original state.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
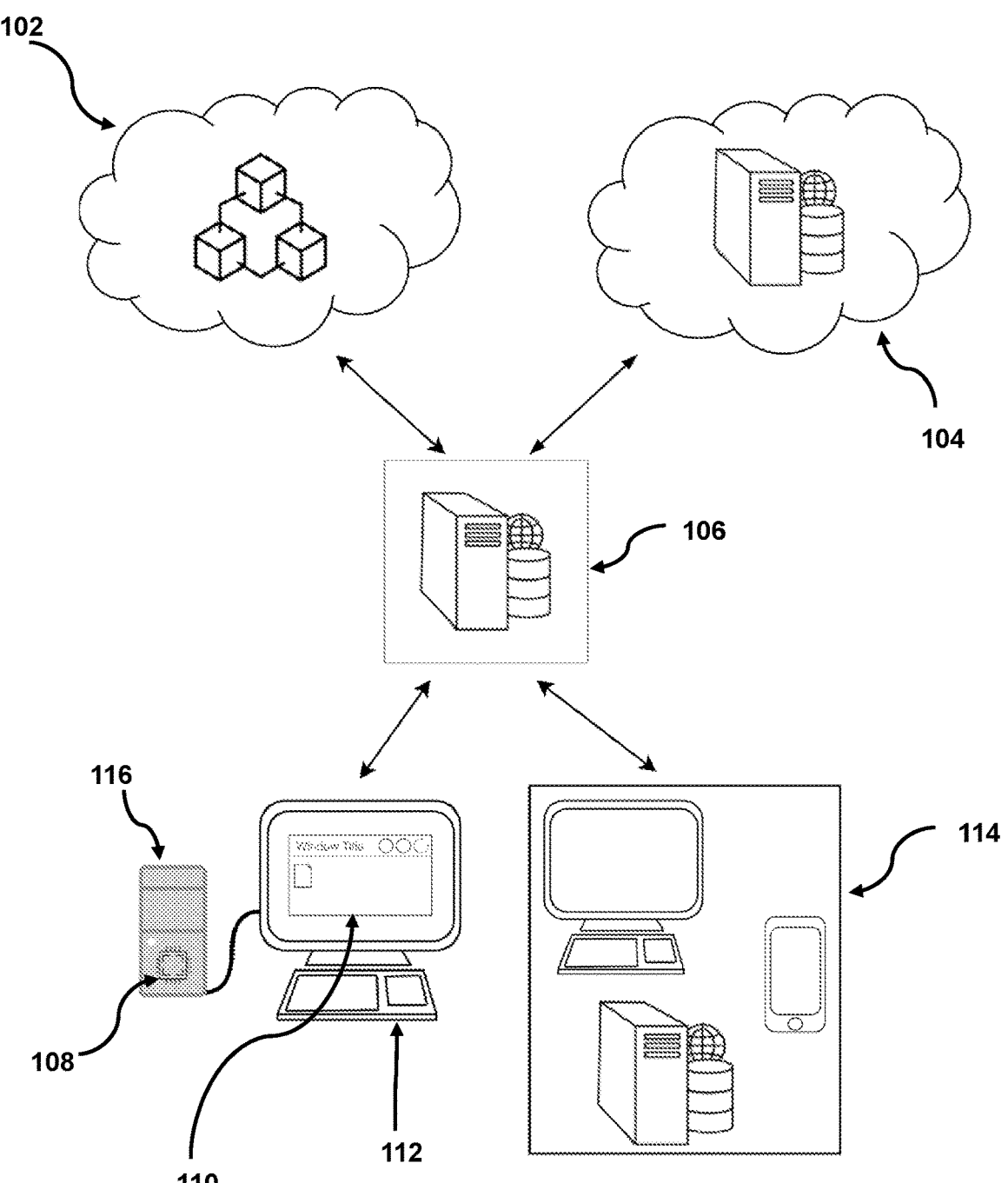
FIG. 1 shows an illustrative overview of the system for implementing a digital container, in accordance with one or more embodiments.

FIG. 1 shows an illustrative overview of the system for implementing a digital container, in accordance with one or more embodiments. For example, system 100 may include server 106, which is responsible for determining if an access code should be granted to refresh access provisions for the user with respect to the digital asset. Server 106 may work in conjunction with server 104 or blockchain 102 to determine whether a machine meets the requirements necessary to receive an access code to refresh access provisions for the user with respect to the digital asset. System 100 also includes user devices that store the digital container (e.g., user devices 114, user device 116, and user device 112). For example, the digital container may be a system-level container stored on components in a computer at the system level (e.g., random access memory ("RAM") 108) or implemented as part of the operating system. In another example, the digital container may be an application-level container implemented as part of one or more applications on the system (e.g., application interface 110).

For example, FIG. 1 illustrates a system to create a digital container that restricts access to digital assets based on the presence of an access code on a user device failing to meet certain criteria. Traditionally, access control mechanisms require a connection to the internet to distribute access control policies. For example, in traditional systems, a policy may be in place such that when a machine is no longer part of the network (e.g., when the employee who used the machine no longer works at an organization), the system remotely wipes the machine (e.g., the computer) to prevent access or distribution of the contents of the machine. If the machine is not connected to the internet, distributing this policy may not be possible. By using a digital container that accesses system-level resources or application-level resources, an internet connection may not be required. For example, creating a digital container solves the problem of conducting access control when a machine is disconnected from the internet. By using a digital container, access control can still be ensured without requiring an internet connection. As such, the system may provide access control for digital assets on machines without an internet connection.

The system may be used to control access to a digital asset. As referred to herein, a "digital asset" may include a file on a machine. A digital asset may be a text document, a photograph, a video, an audio file, a spreadsheet, or another file type. A digital asset may be stored on a local machine or a remote server. A digital asset may include the contents of the file and associated metadata. A digital asset may include access rights for specific machines.

The system may be used to prevent users without an access code from accessing digital assets on a user device. As referred to herein, an "access code" may be an alphanumeric string or another suitable code distributed by a server to a user device. The user device may be able to use the access code to authenticate to a system. Authenticating to a system may provide access to digital assets, initiate a restoration process, or prevent a modification process.

The system may use digital containers to control access to various portions of a computer. As referred to herein, a "digital container" may be a system-level container or an application-level container. The system-level digital container may include a software-defined subsection of the computer architecture, for example, a portion of the RAM or specific processes on a central processing unit ("CPU") or the operating system. The application-level digital container may include a software-defined subsection of one or more applications on the system, for example, specific applications or programs for accessing the digital asset. In some embodiments, the digital container may comprise a system to perform "hardware virtualization." For example, a digital container may be a virtual form of hardware that communicates directly with the physical machine's hard drive or CPU to manage the digital container. In some embodiments, the digital container may comprise a system to perform "software virtualization." For example, a digital container may include a virtualized operating system running on a host machine that allows specific applications to be executed.

The system may be used to prevent users without an access code from accessing digital assets on a user device if the user device does not have access provisions. As referred to herein, "access provisions" may include a set of permissions a user device has that allow the user device to access certain components of a system. The components of the system that may be accessed may include applications or media files. The access provisions may also grant access or deny access to a digital container.

The system may be used to prevent users without an access code from accessing digital assets on a user device by using a modification process. As referred to herein, a "modification process" may include a process that renders one or more portions of a digital asset inaccessible. A modification process may reduce the quality of a photograph, the frame rate of a video, the accessibility of a text document, or another suitable modification. For example, a modification process may remove certain pixels from a photograph, certain frames from a video, or certain pages from a text document. A modification process may be reversible. The modification process may use a database to log changes made to digital assets.

In some embodiments, the system may be used to prevent users from accessing digital assets on a user device based a system of biological decay. For example, the digital asset may be stored on a secure device which modifies or corrupts the digital asset via a natural mechanism. In another example, the digital asset can be modified to be inaccessible using natural decay that occurs over time due to degradation of biologics in the system.

The system may reverse a modification process with a restoration process. As referred to herein, a "restoration process" may include a process that reverses a modification process. A restoration process may be necessary to restore the state of the digital asset prior to a modification process being executed on the digital asset. For example, the restoration process may restore pixels removed by a modification process. In another example, the restoration process may restore frames removed from a video by a modification process. In yet another example, the restoration process may restore bits previously removed from system components. The restoration process may use a database with changes made to digital assets by the modification process. In yet another example, the restoration process may retrieve an original version of the digital asset if the changes made during the modification process intentionally or unintentionally render the digital asset permanently inaccessible. The modification process may render the digital asset permanently inaccessible if the modification process is random, inherent to the system (e.g., every time a digital asset is accessed, random bits are flipped and not tracked), or another suitable process. After the restoration process is performed, the process may update the database to indicate the digital asset has been restored to a previous or original state.

Figure 2:
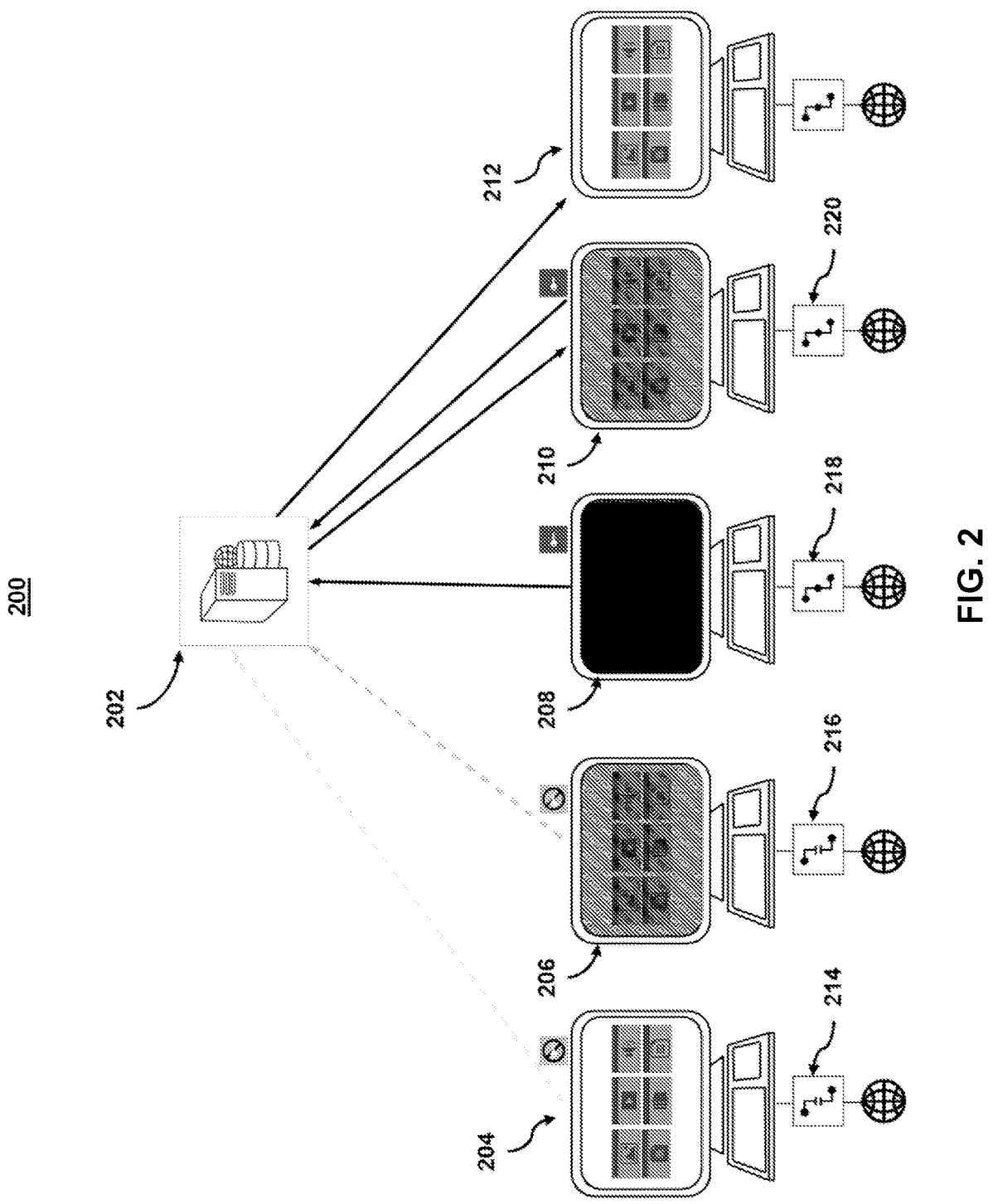
FIG. 2 shows an illustrative diagram of iterative modification and restoration processes for a digital container, in accordance with one or more embodiments.

FIG. 2 shows iterative modification and restoration processes for a digital container, in accordance with one or more embodiments. System 200 allows the iterative modification of a digital asset to restrict access from a user device. System 200 also allows the iterative restoration of the digital asset to provide access to a user device. Conventional systems may not be able to restrict access to digital assets if the user device is not connected to the internet.

For example, in state 204, the user device may not have an access code to refresh access provisions, and internet connection 214 may be unavailable. Server 202 may not be able to provide an access code to refresh access provisions in state 204. Subsequently, a modification process may be executed on the user device in state 204, resulting in the user device in state 206. For example, after the modification process in state 204, the digital asset on a user device may be partially or wholly inaccessible as shown in state 206.

For example, in state 206, the user device may not have an access code, and internet connection 216 may be unavailable. Server 202 may not be able to provide an access code to refresh access provisions in state 206. Subsequently, a further modification process may be conducted on the user device in state 206, resulting in the user device in state 208. For example, after the modification process in state 206, the digital asset on a user device may be partially or wholly inaccessible as shown in state 208.

For example, in state 208, the user device may have an access code to refresh access provisions, and internet connection 218 may be connected. Server 202 may send an access code to the user device in state 208. Subsequently, a restoration process may be executed on the user device in state 208, resulting in the user device in state 210. The access code to refresh access provisions may be used as a trigger for executing a restoration process on the user device. For example, the access code may be used as a trigger for a restoration process that reverts the digital asset to the state prior to the last modification process (i.e., the digital asset on the user device in state 206).

For example, in state 210, the user device may have an access code to refresh access provisions, and internet connection 220 may be connected. Server 202 may send an access code to the user device in state 210. Subsequently, a restoration process may be executed on the user device in state 210, resulting in the user device in state 212. The access code to refresh access provisions may be used as a trigger for executing a further restoration process on the user device. For example, the access code may be used as a trigger for a restoration process that reverts the digital asset to the state prior to the initial modification process (i.e., the digital asset on the user device in state 204).

For example, in state 212, the user device shows the digital asset in a fully restored state with full user access to the digital asset. For example, the user device may be at the same state as in state 204 with full access to any digital assets that were modified in the intervening states.

Figure 3:
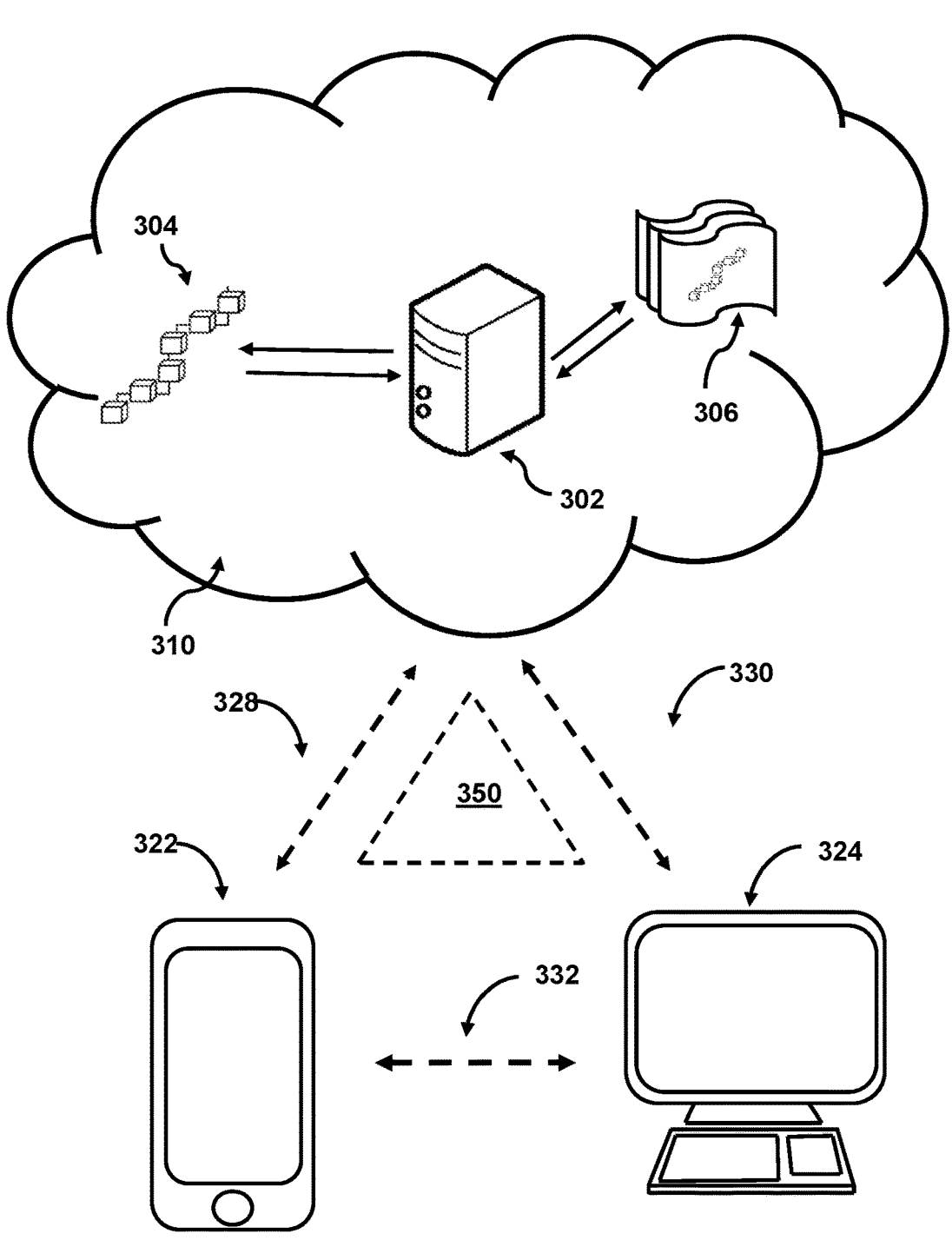
FIG. 3 shows an illustrative diagram of components for a system used to implement a digital container, in accordance with one or more embodiments.

FIG. 3 shows illustrative components for a system used to implement a digital container, in accordance with one or more embodiments. For example, the illustrative components in FIG. 3 may be used for restricting access to digital assets stored locally on a user device without an internet connection. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices.

FIG. 3 also includes cloud components 310. Cloud components 310 may alternatively be any computing device as described above and may include any type of mobile terminal, fixed terminal, or another device. For example, cloud components 310 may be implemented as a cloud computing system and may feature one or more component devices. It should also be noted that system 300 is not limited to three devices. Users may for instance, utilize one or more devices to interact with one another, one or more servers, or other components of system 300. It should be noted that, while one or more operations are described herein as being performed by particular components of system 300, these operations may in some embodiments, be performed by other components of system 300. As an example, while one or more operations are described herein as being performed by components of mobile device 322, these operations may in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a server (e.g., server 302). Server 302 may be responsible for distributing access codes to restore access provisions. Server 302 may query blockchain 304 and receive data contained in a block from a blockchain node to validate a digital asset on a user device prior to distributing the access code to a machine (e.g., mobile device 322 or user terminal 324) to refresh access provisions.

Server 302 may also act as a node in one or more blockchain networks (e.g., blockchain networks 306) and integrate data from mobile device 322 or user terminal 324 into blockchain networks 306. Blockchain networks 306 may respond to queries from server 302 to confirm hashes of blocks or NFTs stored on the blockchain as a prerequisite to server 302 distributing access codes to refresh access provisions. In some embodiments, server 302 may assess blockchain networks 306 or blockchain 304 to determine whether a digital asset was paid for using cryptocurrency. Upon determining that the digital asset was paid for using cryptocurrency, the system may distribute an access code to a user device.

Communication paths (e.g., communication path 328 and communication path 330) may be used to send access codes to restore access provisions to user devices (e.g., mobile device 322 and user terminal 324). User devices (e.g., mobile device 322 and user terminal 324) may be part of a network in which the user devices can communicate together. An application programming interface ("API") (e.g., API layer 350) may be used to send and receive access codes to restore access provisions. Furthermore, an API (e.g., API layer 350) may be used to establish that a user device meets the requirements to receive access codes.

Server 302 may include a model, which may be a machine learning model, artificial intelligence model, etc. (which may be referred to collectively as "models" herein). The model may take inputs and provide outputs. The inputs may include multiple datasets, such as a training dataset and a test dataset. Each of the plurality of datasets may include data subsets related to file hashes, file types, user data, predicted forecasts and/or errors, and/or actual forecasts and/or errors and/or other file metadata. In some embodiments, outputs may be fed back to the model as input to train the model (e.g., alone or in conjunction with user indications of the accuracy of outputs, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a prediction that serves as a necessary prerequisite to server 302 distributing an access code to refresh access provisions). For example, the model may determine the tonality of a file with natural language processing ("NLP"). Using NLP to determine the tonality of a file may help prevent access to files that are not work appropriate or that have been changed to be not work appropriate since the user last viewed the file.

In a variety of embodiments, the model may update its configurations (e.g., weights, biases, or other parameters) based on the assessment of its prediction (e.g., the outputs) and reference feedback information (e.g., user indication of accuracy, reference labels, or other information). In a variety of embodiments, where the model is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may for example, be reflective of the magnitude of error propagated backward after a forward pass has been completed. In this way, for example, the model may be trained to generate better predictions.

In some embodiments, the model may include an artificial neural network. In such embodiments, the model may include an input layer and one or more hidden layers. Each neural unit of the model may be connected with many other neural units of the model. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. The model may be self-learning and trained, rather than explicitly programmed, and can perform significantly better in certain areas of problem solving, as compared to traditional computer programs. During training, an output layer of the model may correspond to a classification of the model, and an input known to correspond to that classification may be input into an input layer of the model during training. During testing, an input without a known classification may be input into the input layer, and a determined classification may be output.

In some embodiments, the model may include multiple layers (e.g., where a signal path traverses from front layers to back layers). In some embodiments, backpropagation techniques may be utilized by the model where forward stimulation is used to reset weights on the "front" neural units. In some embodiments, stimulation and inhibition for the model may be more free-flowing, with connections interacting in a more chaotic and complex fashion. During testing, an output layer of the model may indicate whether a given input corresponds to a classification of the model (e.g., classifying the likelihood that a file is malicious, classifying other risk metrics, or classifying files based on file metadata).

In some embodiments, the model may automatically perform actions based on the outputs. In some embodiments, the model may not perform any actions. The output of the model may be used to determine whether a user device (e.g., mobile device 322 or user terminal 324) should receive an access code to refresh access provisions from server 302. Based on the output of the model, a digital container may remain inaccessible to a user, thereby preventing access to specific digital assets.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in business-to-business ("B2B") transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between the front-end layer and the back-end layer. In such cases, API layer 350 may use RESTful APIs (exposition to front-end or even communication between microservices). API layer 350 may use AMQP (e.g., Kafka, RabbitMQ, etc.). API layer 350 may employ incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

Figure 4:
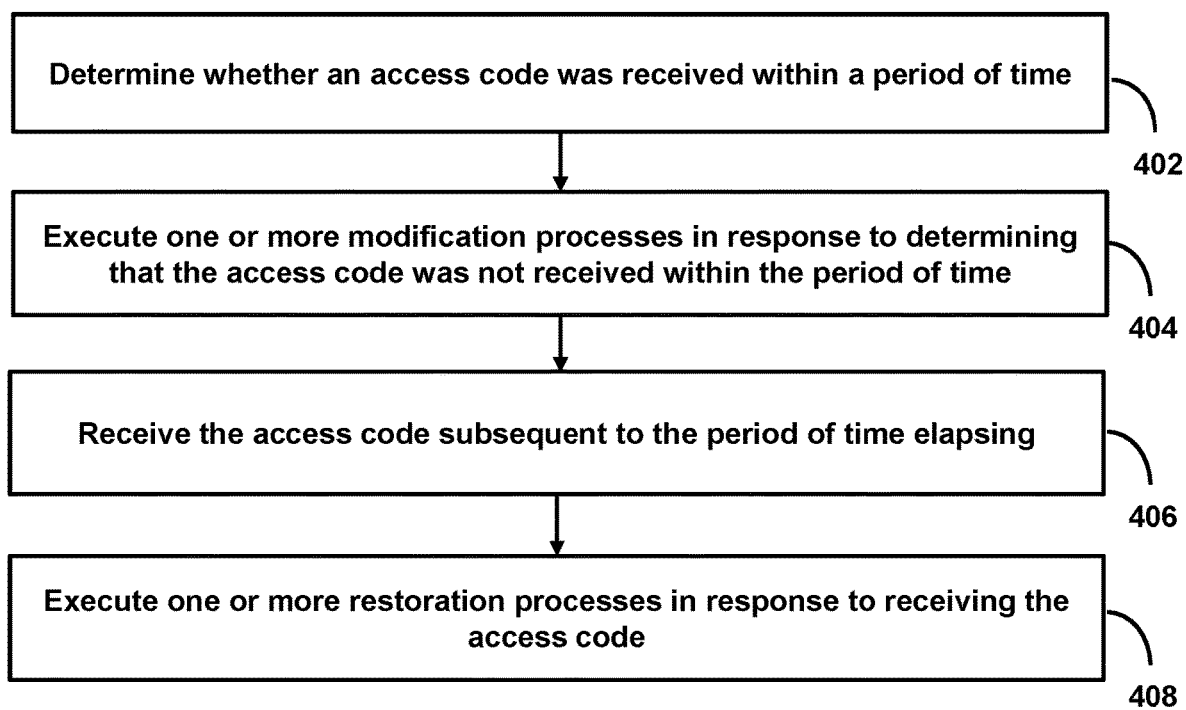
FIG. 4 shows a flowchart of the steps involved in implementing a digital container, in accordance with one or more embodiments.

FIG. 4 shows a flowchart of the steps involved in implementing a digital container, in accordance with one or more embodiments. For example, the system may use process 400 (e.g., as implemented on one or more system components described above with respect to FIG. 1 or FIG. 3) in order to conduct iterative modification processes and subsequent restoration processes to control access to a digital container and restrict user access to digital assets on a machine disconnected from the internet.

At step 402, process 400 determines whether an access code was received within a period of time. For example, the system may determine whether an access code to refresh access provisions for a user with respect to a digital asset was received within a period of time. For example, if a machine does not receive an access code within 10 minutes, the system may determine that the machine has not received an access code to refresh access provisions (e.g., as described with respect to state 204 in FIG. 2). By doing so, the system may not require a machine to be connected to the internet to determine connectivity as a period of time can elapse offline.

At step 404, process 400 executes one or more modification processes in response to determining that the access code was not received within the period of time. For example, the system may in response to determining that the access code was not received within the period of time, execute one or more modification processes to render at least a portion of the digital asset inaccessible. For example, if no access code is received by the machine, the system may execute a modification process that modifies or removes portions of the digital asset associated with the digital container (e.g., as described with respect to states 204 and 206 in FIG. 2). By doing so, the system may limit user access to a digital asset by leveraging the digital container to modify the digital asset. Such a digital container implementation to prevent user access to digital assets may be useful in applications such as access control, DRM, or digital asset sales.

In some embodiments, two modification processes can be performed on different portions of a file. For example, the system may include a first modification process and a second modification process that sequentially modify different portions of the digital asset. For example, a digital asset may be an electronic book ("ebook") that is rented from a library and stored in a digital container. After a period of time has elapsed, the first chapter of the book may be encrypted and rendered inaccessible to the reader. After a second period of time has elapsed, the second chapter of the book may be encrypted, and so on. For example, two restoration processes may be required to fully restore the ebook if the reader wishes to check out the book again. By doing so, the system may be able to control access to a digital asset by modifying the same portion more than once so that even after the first restoration process occurs, part of the digital asset is still inaccessible.

In some embodiments, two modification processes can be performed on the same portion of a file. For example, the system may include a first modification process and a second modification process that sequentially modify the same portion of the digital asset. For example, a video may be the digital asset stored in the digital container that is being modified. A first modification process may distort every fifth frame of the video. A second modification process may further distort every fifth frame again. By distorting the fifth frame twice, the video quality is effectively reduced. By distorting specific frames of the video, the modification processes can effectively degrade the video as time elapses regardless of internet connection. By doing so, the system may be able to adjust the quality of digital assets as time elapses and eventually render the digital asset inaccessible.

In some embodiments, the digital asset may be modified to present a high resolution version or a low resolution version. For example, the digital asset may include a high resolution version and a low resolution version, and the system may execute one or more modification processes to render at least a portion of the digital asset inaccessible by blocking access to a corresponding high resolution version of the portion of the digital asset. For example, the modification process may block access to the high resolution version of the portion of the digital asset if a blockchain transaction is not found (e.g., the digital asset has not been purchased or otherwise legitimately accessed). The lower resolution version of the digital asset may still be available to the user. By doing so, the system may control access to higher quality versions of digital assets, which may discourage unauthorized access and encourage the user to legitimately obtain access to view the higher quality versions of the digital assets.

In some embodiments, the modification process may alter one or more bits of a digital asset. For example, the system may execute one or more modification processes to render at least a portion of the digital asset inaccessible by altering one or more bits of at least a portion of the digital asset according to a code scheme. For example, the system may remove bits from a piece of source code from a subscription-based document viewing program when a device is not connected to a specific server. By doing so, the system may render a piece of software inaccessible to a user, which may help provide access control for software stored locally on devices that are disconnected from the internet.

At step 406, process 400 receives the access code subsequent to the period of time elapsing. For example, the system may subsequent to the period of time elapsing, receive the access code to refresh the access provisions for the user with respect to the digital asset (e.g., as described with respect to states 208 and 210 in FIG. 2). For example, if a machine reconnects to a corporate network, the corporate network may send an access code to refresh access provisions. By doing so, the system may control access to a digital asset based on a predetermined set of criteria (e.g., network connectivity, file metadata, connection time, etc.).

In some embodiments, the system may use an NFT to verify the integrity of a digital asset prior to distributing an access code to refresh access provisions. For example, the system may determine that an NFT associated with the digital asset was received within the period of time and may subsequently process the digital asset to generate a first hash of the digital asset. The system may retrieve a second hash using metadata associated with the NFT. The system may determine whether the first hash matches the second hash associated with the digital asset, and in response to determining that the first hash matches the second hash, obtain the access code to refresh access provisions for the user with respect to the digital asset. For example, if a user accesses a file that is read only and, when offline, modifies the file, the system may generate a hash of the local file and consult the hash of the NFT on a blockchain to determine that the integrity of the file is compromised and refrain from distributing any access codes. By doing so, the system may be able to restrict access to digital assets based on the integrity of the digital asset. Restricting access to the digital asset may help prevent unauthorized manipulation or use of the digital asset.

At step 408, process 400 executes one or more restoration processes in response to receiving the access code. For example, the system may in response to receiving the access code, execute one or more restoration processes to reverse the one or more modification processes, thereby restoring the access provisions for the user with respect to the digital asset (e.g., as described with respect to state 212 in FIG. 2).

For example, if photographs in a digital container are modified locally on a laptop, the photographs may be rendered inaccessible to the user. Once the laptop meets certain criteria, for example, once the laptop is connected to the network of the photography company, a restoration process may occur, thereby allowing the user to access the photographs. By doing so, the system may restrict access to digital assets by unauthorized machines and restore access based on certain criteria. This may help prevent data exfiltration from an organization.

In some embodiments, the restoration process may result in a higher resolution version of the digital asset. For example, the system may execute one or more restoration processes to reverse the modification processes by restoring access to the corresponding high resolution version of at least a portion of the digital asset. For example, a digital asset may be a high resolution photograph. After a period of time, the system may execute a modification process on the high resolution photograph, turning it into a lower resolution photograph. Upon receipt of the access code to refresh access provisions, the system may conduct a restoration process to restore the lower resolution photograph to the higher resolution version. By doing so, the system may control access to high resolution digital assets that may be more valuable than the lower resolution equivalents.

In some embodiments, the restoration process may restore the functionality of a program in the digital container. For example, the system may execute one or more restoration processes to reverse the modification processes by restoring one or more bits of at least a portion of the digital asset according to the code scheme. For example, a digital asset may be a document viewing application. After a period of time, the system may execute a modification process on the document viewing application, thereby making it inaccessible to the user. Upon receipt of the access code to refresh access provisions, the system may execute a restoration process to restore the document viewing application by restoring the removed bits. By doing so, the system may control access to applications on a local user device.

In some embodiments, the digital container may be included in a system-level process. For example, the system-level process may be configured to locally store the digital asset and periodically modify the digital asset to render one or more portions of the digital asset inaccessible to the user. The digital container may be associated with the system-level processes. Therefore, modification processes on a system-level digital container may modify the digital asset associated with the system-level digital container. By doing so, the system may be able to control access via system-level digital containers and subsequently digital assets pertaining to system-level processes, which may contribute to more comprehensive access control.

In some embodiments, the digital container may be included in an application-level process. For example, the application-level process may be configured to access the digital asset from a remote source and periodically modify the digital asset stored in the remote source to render one or more portions of the digital asset inaccessible to the user. For example, the digital container may be associated with the application level, which is concerned with the programs that are run on an operating system such as a text editor, an email client, or a database interface. The digital container may be executed on an operating system in a manner similar to other applications such as a text editor, an email client, or a database interface. Therefore, modification processes on an application-level digital container may send instructions to modify the digital asset remotely accessible to the digital container. By doing so, the system may be able to control access via application-level digital containers and subsequently digital assets stored remotely and accessible via application-level processes, which may contribute to more comprehensive access control.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising determining whether an access code to refresh access provisions for the user with respect to the digital asset was received within a first period of time; in response to determining that the access code was not received within the first period of time, executing a first modification process to render a first portion of the digital asset inaccessible to the user; subsequent to the first period of time elapsing, determining whether the access code was received within a second period of time; in response to determining that the access code was not received within the second period of time, executing a second modification process to render a second portion of the digital asset inaccessible to the user; subsequent to the second period of time elapsing, receiving the access code to refresh the access provisions for the user with respect to the digital asset; in response to receiving the access code, executing a first restoration process to reverse the second modification process and restore the digital asset to a state prior to execution of the second modification process; and subsequent to executing the first restoration process, executing a second restoration process to reverse the first modification process and restore the digital asset to a state prior to execution of the first modification process, thereby restoring the access provisions for the user with respect to the digital asset.

2. A method, the method comprising receiving an access code to refresh access provisions for a user with respect to a digital asset, one or more portions of the digital asset having been rendered inaccessible due to a first modification process and a second modification process executed in sequence on the digital asset; in response to receiving the access code, executing a first restoration process to reverse the second modification process and restore the digital asset to a state prior to execution of the second modification process; and subsequent to executing the first restoration process, executing a second restoration process to reverse the first modification process and restore the digital asset to a state prior to execution of the first modification process, thereby restoring the access provisions for the user with respect to the digital asset.

3. A method, the method comprising determining whether an access code to refresh access provisions for a user with respect to a digital asset was received within a period of time; in response to determining that the access code was not received within the period of time, executing one or more modification processes to render at least a portion of the digital asset inaccessible; subsequent to the period of time elapsing, receiving the access code to refresh the access provisions for the user with respect to the digital asset; and in response to receiving the access code, executing one or more restoration processes to reverse the one or more modification processes, thereby restoring the access provisions for the user with respect to the digital asset.

4. The method of any one of the preceding embodiments, wherein a digital container is included in a system-level process, and wherein the system-level process is configured to locally store the digital asset and periodically modify the digital asset to render one or more portions of the digital asset inaccessible to the user.

5. The method of any one of the preceding embodiments, wherein a digital container is included in an application-level process, and wherein the application-level process is configured to access the digital asset from a remote source and periodically modify the digital asset stored in the remote source to render one or more portions of the digital asset inaccessible to the user.

6. The method of any one of the preceding embodiments, wherein the one or more modification processes include a first modification process and a second modification process, and wherein the at least a portion of the digital asset includes a same portion that is modified by the first modification process and the second modification process.

7. The method of any one of the preceding embodiments, wherein the one or more modification processes include a first modification process and a second modification process, and wherein the at least a portion of the digital asset includes a first portion that is modified by the first modification process and a second portion, different from the first portion, that is modified by the second modification process.

8. The method of any one of the preceding embodiments, wherein the digital asset includes a high resolution version and a low resolution version, and wherein executing the one or more modification processes to render at least a portion of the digital asset inaccessible comprises blocking access to a corresponding high resolution version of the at least a portion of the digital asset.

9. The method of any one of the preceding embodiments, wherein executing the one or more restoration processes to reverse the one or more modification processes comprises restoring access to the corresponding high resolution version of the at least a portion of the digital asset.

10. The method of any one of the preceding embodiments, wherein executing the one or more modification processes to render at least a portion of the digital asset inaccessible comprises altering one or more bits of the at least a portion of the digital asset according to a code scheme.

11. The method of any one of the preceding embodiments, wherein executing the one or more restoration processes to reverse the one or more modification processes comprises restoring one or more bits of the at least a portion of the digital asset according to the code scheme.

12. The method of any one of the preceding embodiments, wherein determining that the access code to refresh access provisions for the user with respect to the digital asset was received within the period of time comprises, within the period of time, receiving a non-fungible token ("NFT") associated with the digital asset; processing the digital asset to generate a first hash of the digital asset; determining whether the first hash matches a second hash associated with the digital asset, the second hash being retrieved using metadata associated with the NFT; and in response to determining that the first hash matches the second hash, obtaining the access code to refresh access provisions for the user with respect to the digital asset.

13. A tangible, non-transitory, machine-readable medium storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for preventing unauthorized access to digital assets, the system comprising:

one or more non-transitory, computer-readable media; and one or more processors coupled to the one or more non-transitory, computer-readable media, configured to cause the system to perform operations comprising:

storing, on a computing device, a digital container comprising a digital asset comprising a first portion and a second portion;

in response to the computing device being disconnected from a computing network, detecting that a first period of time has elapsed;

in response to determining that an access code used to provision the computing device to access the digital asset was not received prior to the first period of time elapsing, executing, via the digital container, a first modification process to prevent the computing device from accessing the first portion of the digital asset while the second portion is accessible;

subsequent to the first period of time elapsing, detecting that a second period of time has elapsed;

in response to determining that the access code was not received prior to the second period of time elapsing, executing, via the digital container, a second modification process to prevent the computing device from accessing the second portion of the digital asset;

subsequent to the second period of time elapsing:

detecting that an internet connection is available, reconnecting the computing device to the computing network, and receiving the access code used to provision the computing device to access the digital asset;

in response to receiving the access code, executing, via the digital container, a first restoration process to reverse the second modification process and restore the digital asset to a first state prior to execution of the second modification process, wherein the first state comprises the digital asset having the first portion being prevented from being accessed and the second portion being accessible; and subsequent to executing the first restoration process, executing a second restoration process to reverse the first modification process and restore the digital asset to a second state prior to execution of the first modification process, the second state comprising the digital asset having the first portion and the second portion accessible.

2. The system of claim 1, wherein the digital container is included in a system-level process configured to locally store the digital asset using the digital container and periodically modify the digital asset to cause one or more portions of the digital asset to be inaccessible.

3. The system of claim 1, wherein the digital container is included in an application-level process configured to access the computing device storing the digital container comprising the digital asset from a remote source and periodically modify the digital asset to cause one or more portions of the digital asset to be inaccessible.

4. A method for preventing unauthorized access, the method comprising:

storing, using a computing device, a digital container comprising a digital asset including a first portion and a second portion;

detecting that the computing device has disconnected from a computing network;

detecting, subsequent to the computing device disconnecting from the computing network, that a first period of time has elapsed;

determining, subsequent to the first period of time elapsing, that an access code used to provision the computing device to access the digital asset was not received prior to the first period of time elapsing;

in response to determining that the access code was not received prior to the first period of time elapsing, executing, via the digital container, a first modification process to prevent the computing device from accessing the first portion of the digital asset while the second portion is accessible;

detecting, subsequent to the first period of time elapsing, that a second period of time has elapsed;

determining, subsequent to the second period of time elapsing, that the access code was not received prior to the second period of time elapsing;

in response to determining that the access code was not received prior to the second period of time elapsing, executing, via the digital container, a second modification process to prevent the computing device from accessing the second portion of the digital asset;

subsequent to the second period of time elapsing: detecting that an internet connection is available;

based on the internet connection being available, reconnecting the computing device to the computing network and receiving the access code used to provision the computing device to access the digital asset;

in response to receiving the access code, executing, via the digital container, a first restoration process to reverse the second modification process and restore the digital asset to a first state prior to execution of the second modification process, wherein the first state comprises the digital asset having the first portion being prevented from being accessed and the second portion being accessible; and subsequent to executing the first restoration process, executing a second restoration process to reverse the first modification process and restore the digital asset to a second state prior to execution of the first modification process, wherein the second state comprises the digital asset having the first portion and the second portion accessible.

5. The method of claim 4, wherein the digital asset includes a high resolution version and a low resolution version, and wherein executing the first modification process comprises blocking access to the first portion of the high resolution version and wherein executing the second modification process comprises blocking access to the second portion of the high resolution version.

6. The method of claim 5, wherein executing the first restoration process comprises restoring access to the second portion of the high resolution version and wherein executing the second restoration process comprises restoring access to the first portion of the high resolution version.

7. The method of claim 4, wherein executing the first modification process comprises altering one or more bits of the first portion of the digital asset according to a code scheme, and wherein executing the second modification process comprises altering one or more bits of the second portion of the digital asset according to the code scheme.

8. The method of claim 7, wherein executing the first restoration process comprises restoring the one or more bits of the second portion of the digital asset according to the code scheme, and wherein executing the second restoration process comprises restoring the one or more bits of the first portion of the digital asset according to the code scheme.

9. The method of claim 4, wherein receiving the access code comprises:

receiving a non-fungible token ("NFT") associated with the digital asset;

processing the digital asset to generate a first hash of the digital asset;

determining that the first hash matches a second hash associated with the digital asset, the second hash being retrieved using metadata associated with the NFT; and in response to determining that the first hash matches the second hash, obtaining the access code to provision the computing device to access the digital asset.

10. The method of claim 4, wherein the digital asset includes a high resolution version and a low resolution version, executing the first modification process comprising blocking access to the first portion of the high resolution version and providing access to the first portion of the low resolution version, and wherein executing the second modification process comprises blocking access to the second portion of the high resolution version and providing access to the second portion of the low resolution version.

11. The method of claim 10, wherein executing the first restoration process comprises restoring access to the second portion of the high resolution version while the first portion of the high resolution version is blocked and executing the second restoration process comprises restoring access to the first portion of the high resolution version.

12. One or more non-transitory, computer-readable media comprising instructions that when executed by one or more processors cause operations comprising:

storing, using a computing device, a digital container, comprising a digital asset, prior to a disconnection of the computing device to a computing network;

based on an access code, to provision the computing device to access the digital asset, not being received prior to a first period of time elapsing, executing, via the digital container, a first modification process that prevents the computing device from accessing a first portion of the digital asset while a second portion of the digital asset is accessible;

based on the access code not being received prior to a second period of time elapsing subsequent to the first period of time, executing, via the digital container, a second modification process that prevents the computing device from accessing the second portion of the digital asset such that the computing device is prevented from accessing both the first portion and the second portion of the digital asset;

subsequent to reconnecting the computing device to the computing network and receiving the access code to refresh access provisions for the computing device to access the digital asset, executing via the digital container, a first restoration process that reverses the second modification process and restores the digital asset to a first state prior to execution of the second modification process, wherein the first state comprises the digital asset having the first portion being prevented from being accessed and the second portion being accessible; and subsequent to executing the first restoration process, executing a second restoration process that reverses the first modification process and restores the digital asset to a second state prior to execution of the first modification process, wherein the second state comprises the digital asset having the first portion and the second portion accessible.

13. The one or more non-transitory, computer-readable media of claim 12, wherein the digital asset includes a high resolution version and a low resolution version, and wherein executing the first modification process comprises blocking access to the first portion of the high resolution version, and wherein executing the second modification process comprises blocking access to the second portion of the high resolution version.

14. The one or more non-transitory, computer-readable media of claim 13, wherein executing the first restoration process comprises restoring access to the second portion of the high resolution version, and wherein executing the second restoration process comprises restoring access to the first portion of the high resolution version of.

15. The one or more non-transitory, computer-readable media of claim 12, wherein executing the first modification process comprises altering one or more bits of the first portion of the digital asset according to a code scheme, and wherein executing the second modification process comprises altering one or more bits of the second portion of the digital asset according to the code scheme.

16. The one or more non-transitory, computer-readable media of claim 15, wherein executing the first restoration process comprises restoring the one or more bits of the second portion of the digital asset according to the code scheme, and wherein executing the second restoration process comprises restoring the one or more bits of the first portion of the digital asset according to the code scheme.

17. The one or more non-transitory, computer-readable media of claim 12, wherein the operations further comprise:

receiving a non-fungible token ("NFT") associated with the digital asset;

processing the digital asset to generate a first hash of the digital asset;

determining that the first hash matches a second hash associated with the digital asset, the second hash being retrieved using metadata associated with the NFT; and in response to determining that the first hash matches the second hash, obtaining the access code to provision the computing device to access the digital asset.

\* \* \* \* \*